April 7, 1925.
P. O. HELLER
1,533,003
WHIP ACTUATING DEVICE
Filed March 29, 1924
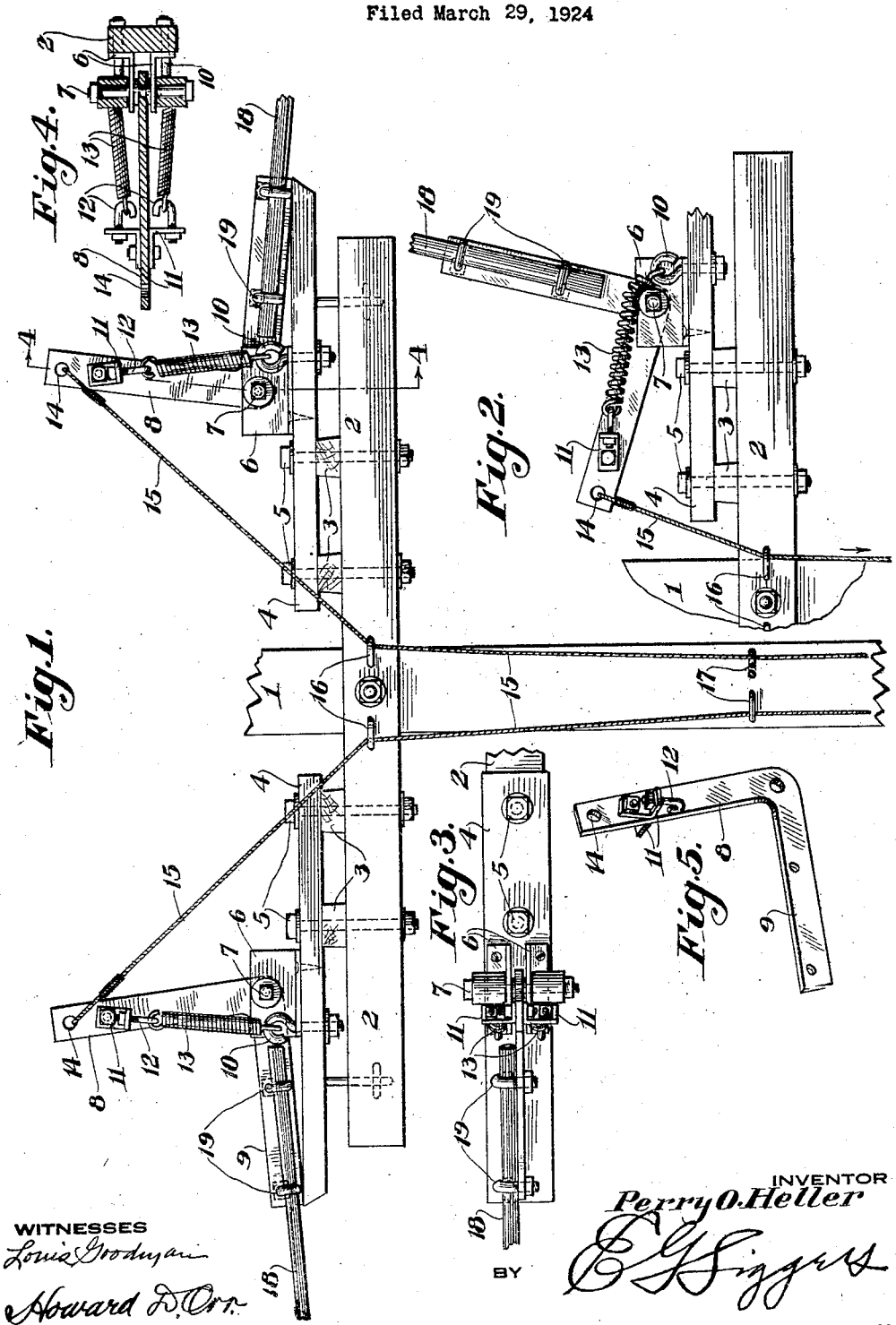
WITNESSES
INVENTOR
Perry O. Heller
BY
ATTORNEY Patented Apr. 7, 1925.

1,533,003

UNITED STATES PATENT OFFICE.

PERRY OSCAR HELLER, OF PROPHETSTOWN, ILLINOIS.

WHIP-ACTUATING DEVICE.

Application filed March 29, 1924. Serial No. 702,915.

*To all whom it may concern:*

Be it known that I, PERRY O. HELLER, a citizen of the United States, residing at Prophetstown, in the county of Whiteside and State of Illinois, have invented a new and useful Whip-Actuating Device, of which the following is a specification.

This invention relates to whip actuating devices.

The object is to provide a device for holding and applying a whip for spurring lagging draft animals of a lead team and is especially designed to be located and fastened in position near the ends of a neck yoke of a wagon tongue, plow tongue, or tongue of any vehicle or farm implement where a lead team is used, without annoying or interfering with the rear team, which, as a rule, does nearly all the work, while the lead team has a tendency to shirk.

Another object is to provide a simple and cheaply manufactured device of this character which may be easily operated by the driver from the seat to apply the whip to either the right hand or the left hand lead animal, or to both at the same time, it being understood that the device is adapted to be attached near the ends of the neck yoke for the purpose.

A full and complete understanding of the invention may be obtained from a consideration of the following detailed description, taken in connection with the accompanying drawing forming a part of this specification, it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claim.

In the drawing, in which similar reference characters designate corresponding parts throughout the several figures;

Figure 1 is a plan view of a portion of a wagon tongue and neck yoke having one of the whip holding and actuating devices secured near to each end of the latter, in inactive position;

Figure 2 is a detail plan view of one of the devices in the position for applying the whip;

Figure 3 is a front elevation of one of the devices;

Figure 4 is a transverse sectional view taken on the line 4—4 of Figure 1;

Figure 5 is a detail perspective of one of the whip actuating levers.

In driving four horses for pulling a wagon, plow or the like, with two horses hitched abreast and in advance of two other horses similarly hitched and known respectively as lead horses and wheel horses, it is a common thing for the said lead horses to shirk their duty and allow the rear or wheel animals to do nearly all the work, as they soon learn that the driver cannot easily reach them with a whip without annoying or unintentionally punishing the said rear animals.

The present invention is designed to apply the whip to the lead animals without touching or annoying the wheel animals, the said devices being carried in a position so as not to interfere with either team until actuated.

In the drawing there is shown a portion of a wagon tongue 1, having a neck yoke 2 connected thereto in the usual manner and provided at the ends with the usual rings for connection to the collars of the rear team by straps, chains, etc.

Secured to the front face of the neck yoke 2 at each side of the tongue, is a pair of spaced blocks 3, and to the outer or front faces of said blocks are secured outwardly extending bars 4, arranged parallel to the neck yoke, with the outer ends of the bars extending somewhat beyond the ends of the neck yoke, suitable bolts 5 securing the several members together.

At intermediate points of the bars 4, a pair of outstanding brackets 6 are secured on the front face thereof, said brackets being spaced apart and provided with suitable alined apertures for the reception of a vertically-disposed pivotal bolt 7, upon which and between the brackets, there is pivoted a bell-crank lever, having an arm 8 normally extending in a longitudinal direction and a right angular arm 9 extending transversely.

The brackets 6 are each provided with attaching plates, which are screwed or otherwise fastened to the bars 4, and the attaching plates are provided with eyes 10 located at points farther from the tongue 1 than the aforesaid pivots 7, as clearly shown in Figure 1. On the top and bottom faces of the forwardly extending arm 8 of the bell-crank lever there is secured a pair of brackets 11 near the front end thereof, said brackets each having a hook-bolt 12 adjustably mounted therein for engagement by the end loops of coiled springs 13, the other end loops of the springs being engaged in the aforesaid eyes 10.

The manner of mounting the springs 13 normally causes the bell-cranks to be rocked back to the position shown in Figure 1, with the outer ends of the arms 9 abutting against the outer extremities of the bars 4.

The forward ends of the arms 8 are each provided with an aperture 14, in which is secured the front ends of cords or wires 15 which extend inwardly and rearwardly, and are passed through eyes 16 mounted on the top side of the neck yoke 2 adjacent to the pivotal bolt thereof, and thence along the tongue 1 and through other eyes 17 to the driver's seat, so as to be grasped by the driver at any time and pulled to rock the bell-crank levers about their pivots against the action of the coiled springs, which will immediately return the levers to their normal position when the pull on the cords or wires is released.

Whips 18 are secured to the upper faces of the arms 9, as by means of eye bolts 19, said whips extending parallel with the said arms or transversely of the line of draft and in front of the rear animals so as not to interfere with the same. When the cords or wires are pulled the whips are brought around in a forward direction to strike the outer sides of the lead horses in a manner easily understood.

From the foregoing it will be seen that a simple, cheaply-manufactured and easily operated device has been provided for attachment near the ends of neck yokes of wagons or the like, whereby, at the will of the driver, either one or both of the lead animals of a four horse team may be urged by the whip in a manner not to interfere with or annoy the rear horses.

What is claimed is:

A device of the class described comprising a supporting bar adapted to be secured to and in advance of a neck yoke, spaced bearing brackets secured to said bar at an intermediate point thereof, a vertical pivot pin mounted in said brackets, a horizontally disposed bell crank lever pivoted at its angle on said pin between said brackets, one arm of said lever normally extending forwardly and the other extending outwardly with respect to the neck yoke, brackets with hook bolts mounted on the forwardly extending arm, a pair of springs connected at one of their ends to the hook bolts and at their other ends to the supporting bar at points between the vertical pivot and the outer end of the other arm, means for securing a whip to the last-named arm, and a pull cord attached to the front end of the forwardly extending arm in advance of the spring connection for rocking the lever against the spring pressure and causing the whip to be swung forwardly and inwardly.

In testimony that I claim the foregoing as my own, I have hereto affixed my signature.

PERRY OSCAR HELLER.